United States Patent
Holstine et al.

(10) Patent No.: US 11,505,326 B2
(45) Date of Patent: Nov. 22, 2022

(54) AUTOMATIC MODE SELECTION SYSTEM

(71) Applicant: AMI Industries, Inc., Colorado Springs, CO (US)

(72) Inventors: Steven Holstine, Colorado Springs, CO (US); Tristan Likes, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 93 days.

(21) Appl. No.: 17/104,623

(22) Filed: Nov. 25, 2020

(65) Prior Publication Data
US 2022/0161935 A1    May 26, 2022

(51) Int. Cl.
B64D 25/10    (2006.01)

(52) U.S. Cl.
CPC .................... B64D 25/10 (2013.01)

(58) Field of Classification Search
CPC .................... B64C 1/32; B64D 25/10
See application file for complete search history.

(56) References Cited

U.S. PATENT DOCUMENTS

| | | | |
|---|---|---|---|
| 4,911,382 A | 3/1990 | Aronne | |
| 5,482,314 A * | 1/1996 | Corrado | ............ B60R 21/01536 701/45 |
| 9,523,985 B1 * | 12/2016 | Barnes | ................. G05D 1/0653 |
| 9,714,862 B2 | 7/2017 | Erhel | |
| 9,738,388 B2 * | 8/2017 | Oleson | ................... B60N 2/002 |
| 2017/0297725 A1 | 10/2017 | Campbell | |
| 2021/0222650 A1 | 7/2021 | Benjamin et al. | |

FOREIGN PATENT DOCUMENTS

| | | | |
|---|---|---|---|
| CN | 109573051 A | * | 4/2019 |
| EP | 3822168 | | 5/2021 |
| EP | 3974321 | | 3/2022 |
| GB | 2551425 | | 12/2017 |
| WO | 2005012088 | | 2/2005 |
| WO | WO-2013120142 A1 | * | 8/2013 ............. B60N 2/002 |

OTHER PUBLICATIONS

United Kingdom Intellectual Property Office, United Kingdom Search Report dated May 23, 2022 in Application No. GB2117019.6.
United Kingdom Intellectual Property Office, United Kingdom Search Report dated May 23, 2022 in Application No. GB2116797.8.
USPTO; Pre-Interview First Office Action dated Apr. 28, 2022 in U.S. Appl. No. 17/104,930.

* cited by examiner

Primary Examiner — Justin M Benedik
(74) Attorney, Agent, or Firm — Snell & Wilmer L.L.P.

(57) ABSTRACT

A system for automatic ejection mode selection may comprise: a first ejection seat configured to receive a first pilot; a second ejection seat configured to receive a second pilot or a non-pilot; a user detection system configured to determine whether the second ejection seat has the second pilot, the non-pilot, or is empty; and a controller configured to adjust an ejection system in response to determining whether the second ejection seat has the second pilot, the non-pilot, or is empty.

14 Claims, 8 Drawing Sheets

AUTOMATIC MODE SELECTION SYSTEM

FIELD

The present disclosure relates to escape systems, and more specifically, to automatic ejection mode selection for escape systems.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Dual occupant aircraft provide unique situations for escape systems as the second occupant may be an additional pilot or a non-pilot.

SUMMARY

A system for automatic ejection mode selection is disclosed herein. The system may comprise: a first ejection seat configured to receive a first pilot; a second ejection seat configured to receive a second pilot or a non-pilot; a user detection system configured to determine whether the second ejection seat has the second pilot, the non-pilot, or is empty; and a controller configured to adjust an ejection system in response to determining whether the second ejection seat has the second pilot, the non-pilot, or is empty.

In various embodiments, the controller is configured to set the ejection system to only eject the second ejection seat when the user detection system determines the second ejection seat has the non-pilot and the non-pilot initiates an ejection event. The user detection system may comprise at least one of an input device configured to receive a user input and a sensor configured to detect user data corresponding to the ejection system. The user detection system may include an image sensor configured to detect image data corresponding to a user, and the user detection system determines whether the user is the second pilot or the non-pilot based on the image data. The user detection system may include the sensor with an electronic port configured to be electrically coupled to an electronic device, wherein the user data includes data received from the electronic device via the electronic port, and wherein the user data includes whether a user is the second pilot or the non-pilot. The ejection system may be adjusted to a single pilot mode, a dual pilot mode, or a dual occupant/single pilot mode in response to the user detection system determining a status of the second ejection seat. The system may further comprise a ejection mode selection system in communication with the controller, wherein the controller sets the ejection mode selection system to only eject the first ejection seat during an ejection event when the ejection system is, based on pilot occupancy, identified as the single pilot mode. The controller may set the ejection mode selection system to eject the first ejection seat and the second ejection seat during an ejection event initiated by either the first pilot or the second pilot when the ejection system is, based on pilot occupancy, identified as the dual pilot mode. The controller may set the ejection mode selection system to eject only the second ejection seat during an ejection event initiated by the non-pilot when the ejection system is, based on pilot occupancy, identified as the dual occupant/single pilot mode, and the controller may set the ejection mode selection system to eject the first ejection seat and the second ejection seat during an ejection event initiated by the first pilot when the ejection system is set to the dual occupant/single pilot mode.

A method for automatic ejection mode selection is disclosed herein. The method may comprise: receiving, via an automatic ejection mode selection system, an indication whether an ejection system with a first pilot in a first ejection seat and a second ejection seat has a second pilot in the second ejection seat, has a non-pilot in the second ejection seat, or the second ejection seat is empty; and adjusting, via the automatic ejection mode selection system, the ejection system in response to determining an occupancy in the second ejection seat.

In various embodiments, the method may further comprise receiving, via the automatic ejection mode selection system, passive data corresponding to the first pilot. In various embodiments, adjusting the ejection system further comprises adjusting the ejection system to a single pilot mode in response to the second ejection seat being empty. In various embodiments, adjusting the ejection system further comprises adjusting the ejection system to a dual occupant/single pilot mode in response to the second ejection seat having the non-pilot. In various embodiments, adjusting the ejection system further comprises adjusting the ejection system to a dual pilot mode in response to the second ejection seat having a pilot. In various embodiments, in the dual occupant/single pilot mode, only the second ejection seat is ejected when the non-pilot initiates an ejection event. In various embodiments, in the dual occupant/single pilot mode, the first ejection seat and the second ejection seat are ejected in response to the first pilot initiating the ejection event, and in the dual pilot mode, the first ejection seat and the second ejection seat are ejected when either the first pilot or the second pilot initiates the ejection event. The method may further comprise receiving, via the automatic ejection mode selection system, user data from one of an input device configured to receive a user input or a sensor configured to detect the user data, wherein the non-pilot is determined when the user input does not match a pilot user input.

An article of manufacture is disclosed herein. The article of manufacture may include a tangible, non-transitory computer-readable storage medium having instructions stored thereon that, in response to execution by a processor, cause the processor to perform operations comprising: receiving, via the processor, a desired ejection mode of an ejection system with a first pilot in a first ejection seat and a second ejection seat that is empty, has a second pilot therein, or has a non-pilot therein; and automatically commanding, via the processor, the ejection system to be in the desired ejection mode.

In various embodiments, the operations further comprise receiving, via the automatic ejection mode selection system, passive data corresponding to each user of the ejection system. In various embodiments, the operations further comprise adjusting the ejection system to a dual occupant/single pilot mode in response to the second ejection seat having a non-pilot, wherein the dual occupant/single pilot mode is configured to eject only the non-pilot in response to the non-pilot initiating an ejection event.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
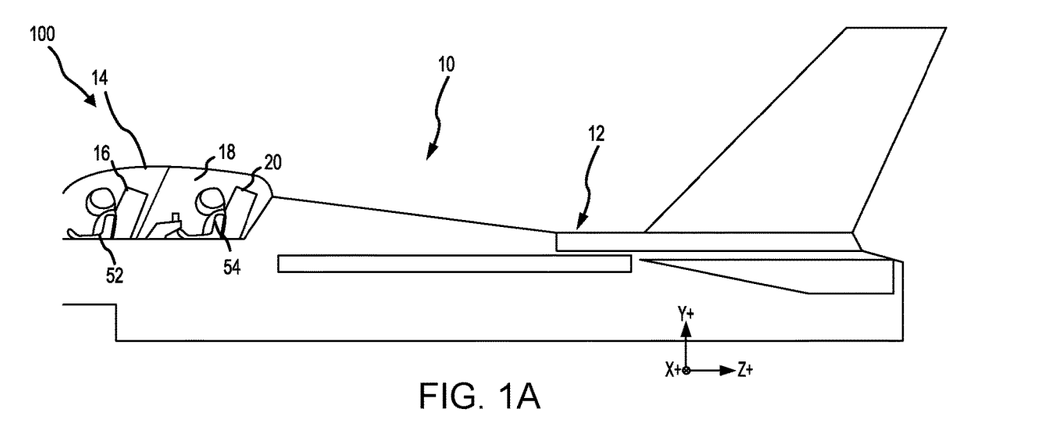
FIG. 1A illustrates an aircraft ejection system in a first mode, in accordance with various embodiments.

Referring now to FIG. 1A, an aircraft 10 having an automatic ejection mode selection system 100 in a dual pilot mode is illustrated, in accordance with various embodiments. The aircraft 10 may include a fuselage 12. The fuselage 12 may define or include a first cockpit 14 having a first ejection seat 16 and a second cockpit 18 having a second ejection seat 20. In various embodiments, the second cockpit 18 is fluidly isolated from the first cockpit 14. Although illustrated as including two separate cockpits 14, 18, the present disclosure is not limited in this regard. For example, a cockpit having the first ejection seat 16 and the second ejection seat 20 is within the scope of this disclosure. In various embodiments, by having separate cockpits (e.g., first cockpit 14 and second cockpit 18), the second ejection seat 20 may be ejected while the first ejection seat 16 may remain in the aircraft without exposing the pilot to air at the altitude of the aircraft 10.

In various embodiments, when the automatic ejection mode selection system 100 is in the "dual pilot mode," the aircraft 10 includes a first pilot 52 and a second pilot 54. In various embodiments, the automatic ejection mode selection system 100 is configured to detect a dual pilot mode. In this regard, upon detection of a dual pilot ejection mode, the automatic ejection mode selection system 100 is configured to initiate a dual pilot ejection (e.g., eject the second pilot 54 followed by ejecting the first pilot 52) in response to either the first pilot 52 or the second pilot 54 initiating the ejection as described further herein.

Figure 1B:
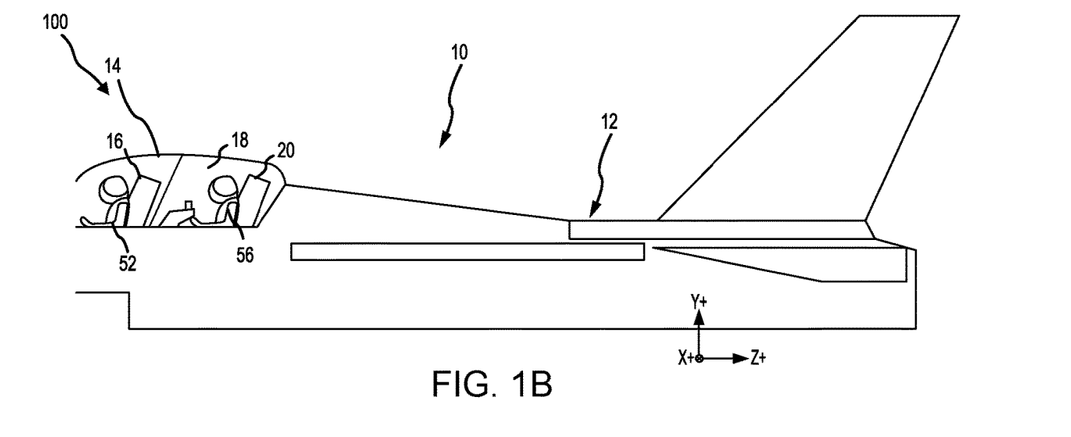
FIG. 1B illustrates an aircraft ejection system in a second mode, in accordance with various embodiments.

Referring now to FIG. 1B, the aircraft 10 having the automatic ejection mode selection system 100 in a dual occupant/single pilot mode is illustrated, in accordance with various embodiments. In various embodiments, when the automatic ejection mode selection system 100 is in the dual occupant/single pilot mode, the aircraft includes a pilot 52 in the ejection seat 16 of the first cockpit and a non-pilot 56 in the ejection seat 20 of the second cockpit 18. In various embodiments, the automatic ejection mode selection system 100 is configured to detect the dual occupant/single pilot mode. In this regard, upon detection of a dual occupant/single pilot mode, the automatic ejection mode selection system 100 is configured to initiate an ejection of only the non-pilot 56 in response to the non-pilot initiating the ejection and initiate ejection of the both the non-pilot 56 and the pilot 52 ejection (e.g., eject the non-pilot 56 followed by ejecting the pilot 52) in response to the pilot 52 initiating the ejection as described further herein. In various embodiments, by recognizing a non-pilot 56 in the second ejection seat 20 of the second cockpit 18, the automatic ejection mode selection system 100 may allow a pilot 52 to continue to fly the aircraft 10 if the non-pilot 56 initiates an ejection.

Figure 1C:
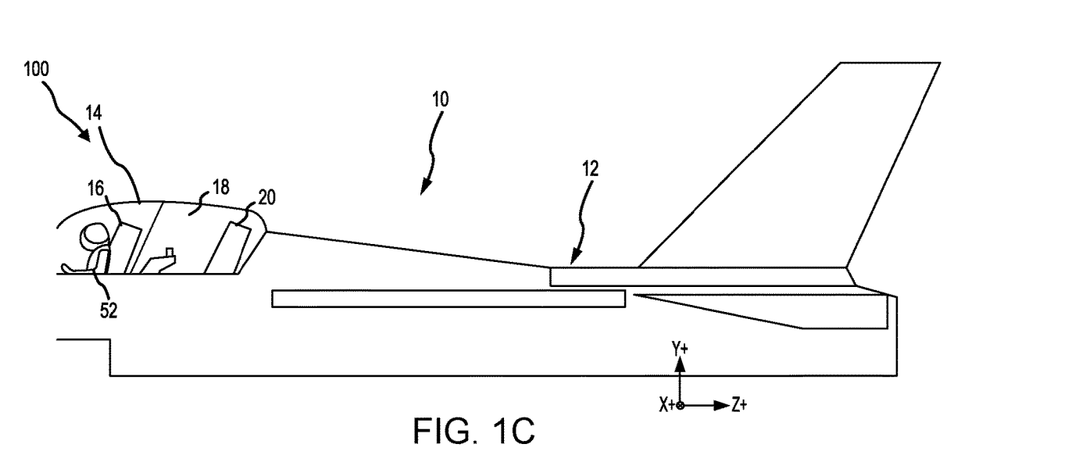
FIG. 1C illustrates an aircraft ejection system in a third mode in accordance with various embodiments.

Referring now to FIG. 1C, the aircraft 10 having the automatic ejection mode selection system 100 in a single pilot mode is illustrated, in accordance with various embodiments. In various embodiments, when the automatic ejection mode selection system 100 is in the single pilot mode, aircraft 10 includes a pilot 52 in the ejection seat 16 of the first cockpit 14, and the ejection seat 20 of the second cockpit 18 is empty. In various embodiments, the automatic ejection mode selection system 100 is configured to detect the single pilot mode. In this regard, upon detection of the single pilot mode, the automatic ejection mode selection system 100 is configured to initiate an ejection of only pilot 52 in ejection seat 16 in response to the pilot 52 initiating the ejection.

Figure 2A:
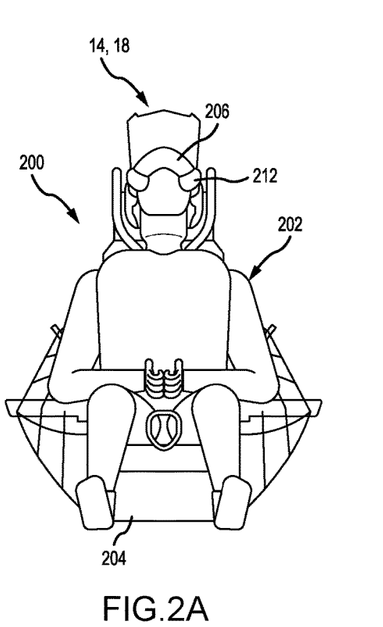
FIG. 2A illustrates a front view of an aircraft ejection system, in accordance with various embodiments.
Figure 2B:
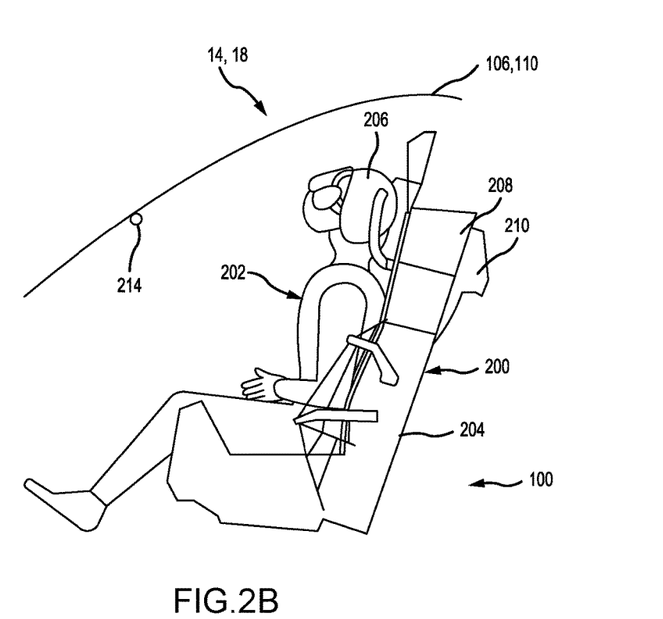
FIG. 2B illustrates a side view of an aircraft ejection system, in accordance with various embodiments.

Referring now to FIGS. 2A and 2B, an exemplary ejection system 200 may be included in the cockpit 14, 18. In particular, the ejection system 200 may include a seat 204 (e.g., ejection seat 16 or ejection seat 20) on which a user 202 (e.g., a pilot 52, a pilot 54, or a non-pilot 56 from FIGS. 1A-1C) may sit or otherwise rest and a helmet 206 which may be supported on a head of the user 202. The seat 204 may include various components of the ejection system 200 such as a main parachute 208 and a drogue 210. The seat 204 may further include a catapult or rocket that ejects the seat 204 and any occupant thereof from the cockpit 104. The drogue 210 may be a parachute that initially deploys after ejection of the seat 204 and may reduce a velocity of the seat 204 as it travels towards a ground surface. The main parachute 208 may deploy after the drogue 210 and may provide further reduction of the velocity of at least one of the seat 204 or the user 202 as it travels towards the ground surface.

Referring now to FIGS. 2A, 2B, 3A, and 3B, the system 100 may automatically adjust features of the ejection system 200 based on passive detected data. "Passive detected data" may refer to any data that is detected by a sensor without an action performed by the user 202. For example, if a radio frequency identification (RFID) reader detects a RFID tag located on the user 202 as the user enters the cockpit 104, the data detected by the RFID reader (i.e., any data transferred to the RFID reader from the RFID tag) may be referred to as "passive detected data." In various embodiments, a non-pilot may wear gear including an RFID tag indicating the non-pilot is a non-pilot. Similarly, a pilot may wear gear including an RFID tag indication the pilot is a pilot. In this regard, the passive detected data may be an input for the automatic ejection mode selection system 100 from FIGS. 1A-1C, in accordance with various embodiments.

Figures 3A, 3B:
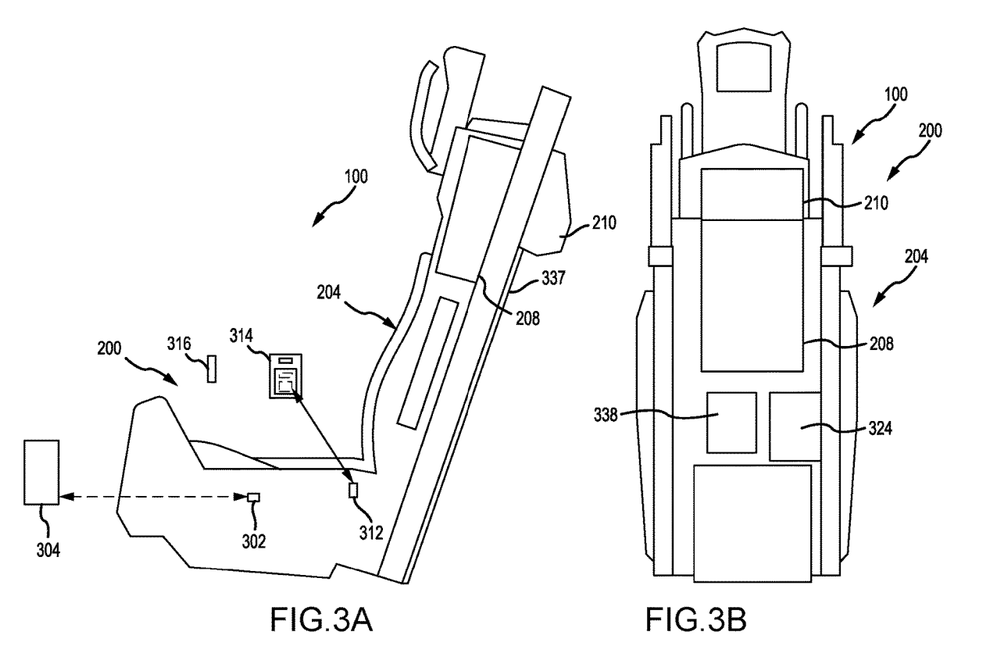
FIG. 3A illustrates a side view of an automatic ejection mode selection system, in accordance with various embodiments.
FIG. 3B illustrates a back view of an automatic ejection mode selection system, in accordance with various embodiments.

The system 100 may include a controller 302. The controller 302 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 302 may further include any non-transitory memory known in the art. The memory may store instructions usable by the logic device to perform operations.

The system 100 may further include a database or remote memory 304. The database 304 may be located on a same aircraft as the system 100 or may be located remote from the system 100. The controller 302 may communicate with the database 304 via any wired or wireless protocol. In that regard, the controller 302 may access data stored in the database 304. The database 304 may store identifiers associated with users of the system 100 and may store specific settings for various components of the ejection system 200 that are associated with each of the user identifiers. For example, a first user identifier may be associated with a first set of settings for the ejection system 200 and a second user identifier may be associated with a second set of settings for the ejection system 200. The controller 302 may access the specific settings for each user identifier by comparing the user identifier to the database 304.

The system 100 may further include one or more sensor. For example, the sensor may include any one or more of a first image sensor 212, a second image sensor 214, or an electronic port 312. Each of the sensors may communicate with the controller 302.

The system 100 may further include one or more sensor. For example, the sensor may include any one or more of a first image sensor 212, a second image sensor 214, or an electronic port 312. Each of the sensors may communicate with the controller 302.

The first image sensor 212 may be located on the helmet 206 and may detect data corresponding to a face of the user 202. The first image sensor 212 may include a camera, light detector, infrared detector, or any other image sensor capable of detecting image data corresponding to any wavelength of light. The image sensor 212 may be designed to detect image data corresponding to a biometric feature of the user. For example, the image sensor 212 may be configured to detect a retina scan of the user. As another example, the image sensor 212 may be configured to detect a face of the user. The controller 302 may receive the detected retinal scan or facial scan of the user and may perform a facial recognition algorithm or a retinal recognition algorithm to identify the user. That is, the controller 302 may determine a specific identifier of the user based on the detected facial scan or retinal scan. The controller 302 may retrieve the specific settings associated with the specific identifier of the user from the database 304 using the determined specific identifier of the user. In various embodiments, when the scanner does not recognize a user, the user may be identified as a non-pilot (e.g., non-pilot 56 from FIG. 1B). In this regard, each pilot may have specific user data and/or user settings, whereas a non-pilot may not.

The second image sensor 214 may be located on another portion of the ejection system 200 away from the helmet 206 and may include a camera, light detector, infrared detector, or any other image sensor capable of detecting image data corresponding to any wavelength of light. For example, the second image sensor 214 may be located on the canopy 106 of the first cockpit 14 or the second cockpit 18. As another example, the second image sensor 214 may be located at an entrance location of the aircraft 10 of FIGS. 1A-1C, the first cockpit 14, and/or the second cockpit 18. The second image sensor 214 may detect a facial scan of the user 202 or a retinal scan of the user 202 in a similar manner as discussed above with reference to the first image sensor 212. In that regard, the controller 302 may determine an identifier of the user 202 based on the image data, may retrieve the specific settings associated with the user identifier from the database 304, and adjust the adjustable settings of the ejection system 200 based on the specific settings.

The electronic port 312 may be designed to communicate with at least one of a first electronic device 314 or a second electronic device 316 via a wireless protocol. For example, the electronic device 314 may be a portable computing device and may include a mobile telephone, a tablet, a laptop, or the like. For example, the electronic device 316 may include, for example, a RFID tag, a key fob, a near field communication (NFC) transmitter, or the like. For example, the electronic port 312 and at least one of the first electronic device 314 or the second electronic device 316 may communicate via a wireless protocol such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, a RFID protocol, a NFC protocol, or any other protocol capable of wireless transmissions.

The electronic port 312 may automatically communicate with at least one of the first electronic device 314 or the second electronic device 316 in response to the first electronic device 314 or the second electronic device 316 being located within range of the electronic port 312. In response to initiation of these communications (or in response to another action after such communications are established), the electronic port may be provided with information from the first electronic device 314 or the second electronic device 316. The information may include an identifier of the user 202, other data related to the user 202 (in which case the controller 302 may determine the identifier based on the other data), or specific settings of the user related to the ejection system 200.

In response to receiving a specific user identifier or determining the specific user identifier based on the received data at the electronic port 312, the controller 302 may determine a mode as described previously herein (e.g., dual pilot mode from FIG. 1A, dual occupant/single pilot mode from FIG. 1B, or single pilot mode from FIG. 1C). The controller 302 may adjust the ejection settings of the ejection system 200 based on the retrieved or received specific settings of the user.

The controller 302 may directly control the various settings of the ejection system 200 or may provide instructions to components of the ejection system 200 and those components may adjust the settings. For example, the ejection system 200 may include a seat electronic sequencer 324 and/or an interseat electronic sequencer 338. Each of the seat electronic sequencer 324 and/or the interseat electronic sequencer 338 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, these elements may further include any non-transitory memory known in the art. The seat electronic sequencer 324 and/or the interseat electronic sequencer 338 may be coupled to the controller 302 and may receive the specific settings from the controller 302 or may receive instructions regarding adjustments of components of the ejection system 200 from the controller 302.

The seat electronic sequencer 324 may make adjustments to components of the ejection system 200 that alter a sequence or timing of ejection events such as settings associated with an ejection order based on which cockpit (e.g., cockpit 14 or cockpit 18 from FIGS. 1A-1C) initiates the ejection. For example, the seat electronic sequencer 324 may set only the second ejection seat 20 to eject from aircraft 10 when initiated by a non-pilot 56 from FIG. 1B, in accordance with various embodiments. The seat electronic sequencer 324 may set both the first ejection seat 16 and the second ejection seat 20 to eject when in a dual pilot mode of FIG. 1A, in accordance with various embodiments.

The interseat electronic sequencer 338 may make adjustments to components of the ejection system 200 that affect an interseat timing between components. For example, the interseat electronic sequencer 338 may adjust a timing or delay between ejection of the seat 204 and separation of at least one of a hatch or canopy (e.g., the hatch or canopy 106, 110 of FIG. 2B) from the respective fuselage, or adjust a delay between ejection of two or more cockpits (e.g., between the first cockpit 14 and the second cockpit 18 of FIGS. 1A-1B). For example, it may be desirable for a different timing to be used for a heavier user relative to a lighter user. The interseat electronic sequencer 338 may select an order of ejection between two or more cockpits based on the specific settings of two or more users (e.g., a first pilot 52 and a second pilot 54 of FIG. 1A or a pilot 52 and a non-pilot 56 of FIG. 1B).

Figure 4:
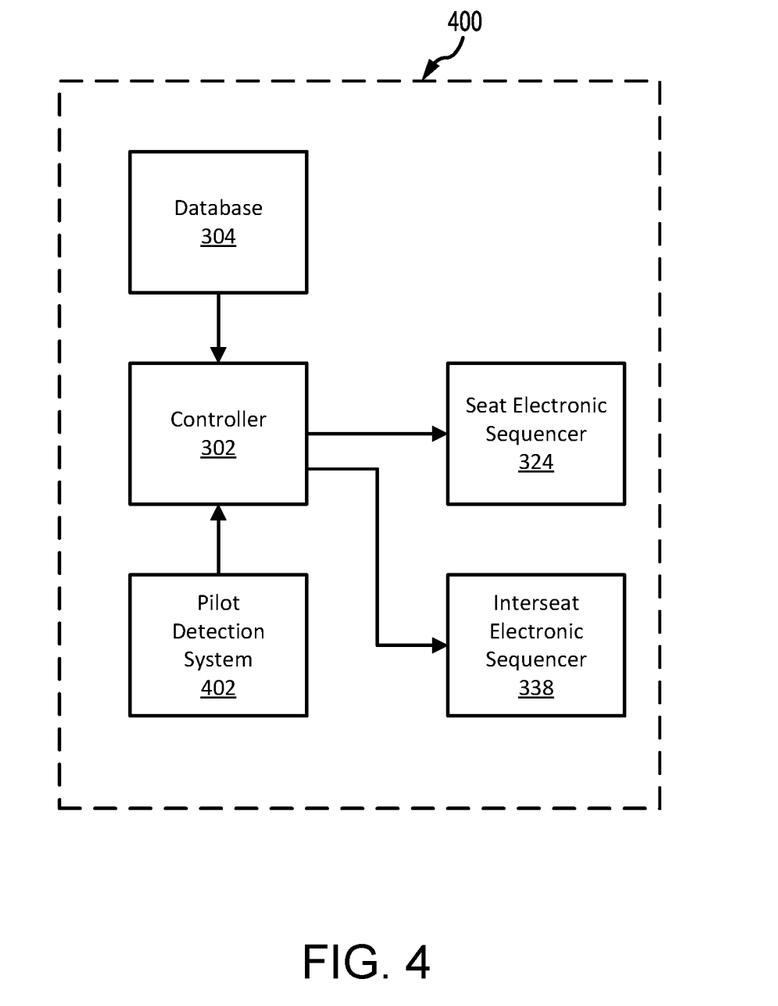
FIG. 4 illustrates a schematic view of a control system for an ejection system, in accordance with various embodiments.

Referring now to FIG. 4, a control system for an automatic ejection mode selection system 100 from FIGS. 1A-1C is illustrated, in accordance with various embodiments. In various embodiments, the control system 400 includes the controller 302, the database 304, the seat electronic sequencer 324, the interseat electronic sequencer 338, and a user detection system 402. In various embodiments, the user detection system 402 is configured to detect whether the aircraft has dual pilots, a pilot and a non-pilot, or only a single pilot, and adjust a settings for an ejection event based on the determination. In this regard, the user detection system 402 is configured to determine whether the second ejection seat 20 from FIGS. 1A-1C has a second pilot 54 (e.g., FIG. 1A), has a non-pilot 56 (e.g., FIG. 1B), or is empty.

In various embodiments, the user detection system 402 may be in accordance with the system of FIG. 3A-3B (e.g., electronic port 312 communicating with the electronic devices 314, 316 carried by a pilot and/or non-pilots). In this regard, when in a dual pilot mode (e.g., FIG. 1A), the controller 302 may set the seat electronic sequencer 324 to eject both ejection seats (e.g., ejection seat 16 and ejection seat 20 from FIG. 1A) in response to either ejection handle (e.g., an ejection handle in the first cockpit 14 or an ejection handline in the second cockpit 18) being initiated, in accordance with various embodiments. Furthermore, in a dual pilot mode, identifiable information for each pilot may be stored in database 304 as discussed with respect to FIGS. 3A-3B above. In this regard, interseat electronic sequencer 338 may be adjusted in accordance with the physical characteristics of each pilot, in accordance with various embodiments.

When in a dual occupancy/single pilot mode (e.g., FIG. 1B), the controller 302 may set the seat electronic sequencer 324 to eject only the aft ejection seat (e.g., ejection seat 20 from FIG. 1B) in response to an aft ejection handle (e.g., an ejection handle in second cockpit 18) being initiated, in accordance with various embodiments. When in the dual occupancy/single pilot mode, the controller 30 may further set the interseat electronic sequencer 338 to eject both ejection seats (e.g., ejection seat 16 and ejection seat 20 from FIG. 1B) in response to an ejection handle in the first cockpit (e.g., cockpit 14 from FIG. 1B) being initiated. In this regard, a non-pilot may not eject a pilot in a dual occupancy/single pilot mode, in accordance with various embodiments. By not allowing a non-pilot to eject a pilot, an ejection system may be mistake-proofed and prevent a loss of an aircraft in an event where a non-pilot initiates an ejection handle, in accordance with various embodiments.

When in a single pilot mode (e.g., FIG. 1C), the controller 302 may set the interseat electronic sequencer 338 to eject only the ejection seat occupied by the pilot (e.g., ejection seat 16 in FIG. 1C). In this regard, by not ejecting the second ejection seat when in a single pilot mode, there would be no risk of the second ejection seat interfering with the descent of the pilot, and a reduction of time for the first ejection seat to leave the aircraft as the first ejection seat does not have to wait for the second ejection seat (e.g., pilot 52 from FIG. 1C).

In various embodiments, the user detection system 402 may include a connector for a helmet, a harness, a communication device, an oxygen device, or the like that a pilot carries between aircraft. In this regard, the controller 302 may determine or identify information corresponding to the user (e.g., pilot 52 from FIGS. 1A-1C, pilot 54 from FIG. 1A, or non-pilot 56 from FIG. 1B) by analyzing the connector portion of the respective connector (which is carried by the pilot between aircraft and provided to a non-pilot prior to flight). Thus, the information corresponding to the pilot may be automatically learned by a controller of a cockpit of any aircraft with a system similar to the system 400 by analyzing the connector portion of the respective connector. Similarly, the fact that the second seat is occupied by a non-pilot may be automatically learned by the controller of a cockpit of any aircraft with a system similar to the system 400 by analyzing the connector portion of the respective connector. The information corresponding to the user when the user is a pilot may include physical characteristics of the pilot, information usable to determine an identifier of the pilot, specific settings for components of the ejection system 200, or the like. When the user is a non-pilot, default settings for the components of the ejection system 200 may be utilized, in accordance with various embodiments.

In various embodiments, the user detection system 402 may comprise a voice recognition algorithm configured to identify a user. For example, a microphone in the cockpit (e.g., cockpit 14 and/or or cockpit 18) or helmet 206, may be configured to detect a voice of a user. When the voice of the user is unidentifiable, the user detection system 402 may determine the user is a non-pilot and command the seat electronic sequencer 324 and the interseat electronic sequencer 338 accordingly as outlined above.

In various embodiments, the user detection system 402 may include an image sensor, such as a camera, a light detector, an infrared detector, or any other image sensor capable of detecting image data corresponding to any wavelength of light. The image sensor may be designed to detect image data corresponding to a biometric feature of the user, such as a fingerprint scanner, a retina scanner, or the like. The controller 302 may receive the detected fingerprint or retina from the user and determine a specific identifier of the user based on the detected fingerprint scan or retina scan (e.g., whether the user is a pilot or a non-pilot). In response to determining whether the user is a pilot or a non-pilot, the controller 302 may command the seat electronic sequencer 324 and/or the interseat electronic sequencer 338 as described previously herein.

Figure 5:
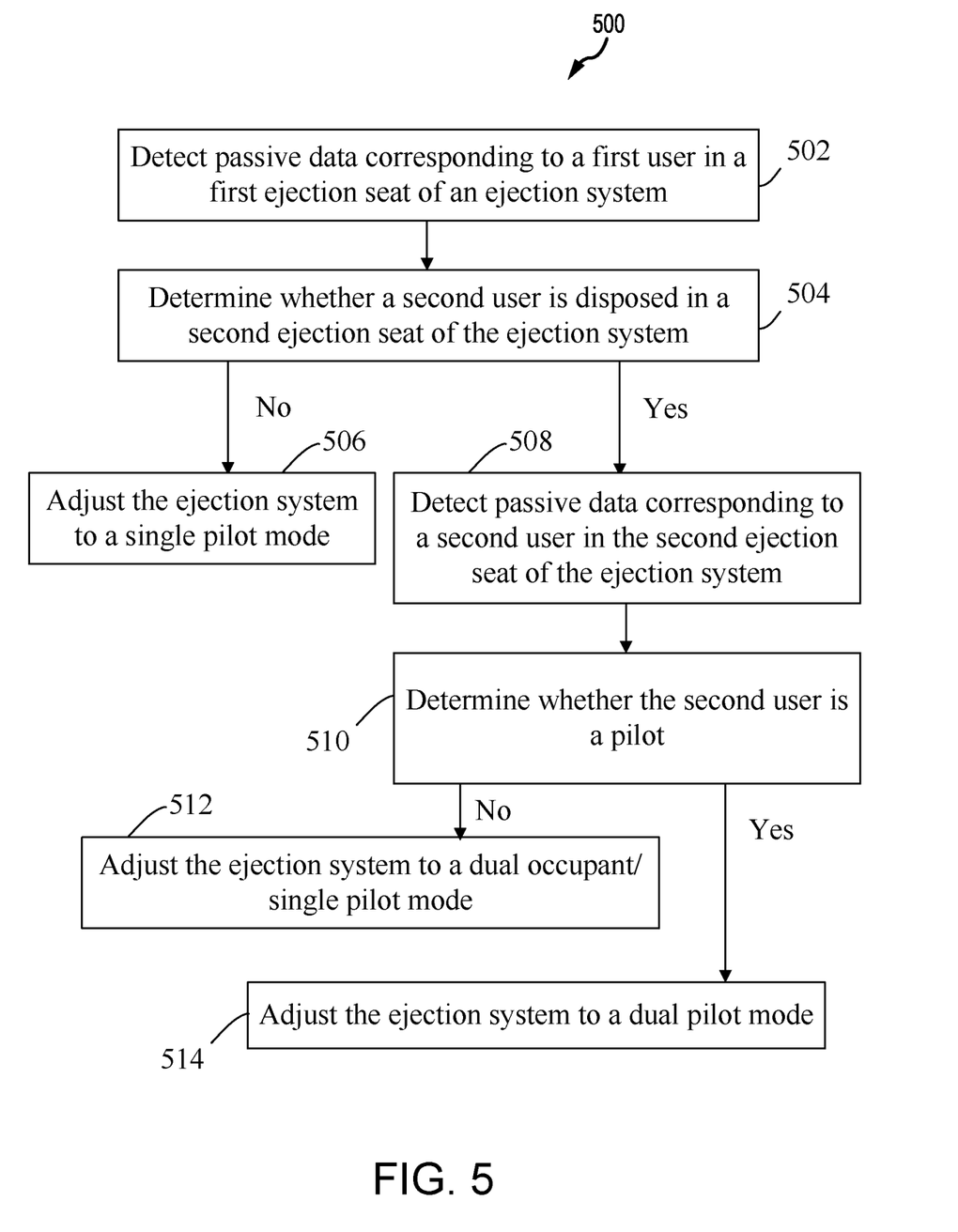
FIG. 5 illustrates a method for automatic ejection mode selection, in accordance with various embodiments.

Referring now to FIG. 5, a flowchart illustrates a method 500 for automatic adjustment of an ejection system, in accordance with various embodiments. The method 500 may be performed by components of a system similar to the system 100 of FIGS. 2A, 2B, 3A, and 3B and/or system 400 of FIG. 4. The method 500 may begin in block 502 where a user detection system may detect passive data corresponding to a first user of an ejection system. The user detection system may include a user input, such as biometric data (e.g., a fingerprint or retina scan detected by an image sensor), electronic data detected by an electronic port from an electronic device (e.g., a portable electronic device), electronic data detected by a user specific connector, or the like. The user data may be passive detected data detected without action from a user (besides potentially bringing an electronic device within range of the sensor).

In block 504, the user detection system may determine whether a second user is disposed in a second ejection seat of the system. When the user detection system determines there is not a second user disposed in the second ejection seat, the controller may adjust an ejection system to a single pilot mode (block 506) as illustrated in FIG. 1C. In the single pilot mode, only the ejection seat with the pilot detected in block 502 may be ejected during an ejection event.

When the user detection system determines there is a second user disposed in the second ejection seat, the method 500 moves to block 508. In block 508, the system detects passive data corresponding to the second user in the second ejection seat of the ejection system in a manner similar to block 502.

In block 510, the system determines whether the second user is a pilot. In this regard, each pilot may have a user identifier, such as biometric data as described above, electronic data detected via various devices, or the like, whereas a non-pilot may either have a non-pilot identifier provided to the non-pilot for the flight, such as any of the above provided to non-pilots, in accordance with various embodiments. In various embodiments, the non-pilot may not be provided any of the above, and the system may determine the second user is not a pilot based on the absence of any of the above.

In block 512, when the system determines the second user is not a pilot, the controller may adjust the ejection system to a dual occupant/single pilot mode. In the dual occupant/single pilot mode, the ejection system may eject only the non-pilot when the non-pilot initiates ejection. In the dual occupant/single pilot mode, the ejection system may eject both the non-pilot and the pilot when the pilot initiates ejection. In this regard, in various embodiments, an aircraft may be allowed to continue to be flown by a pilot when a non-pilot initiates ejection from the aircraft.

In block 514, when the system determines the second user is a pilot, the controller may adjust the ejection system to a dual pilot mode. In the dual pilot mode, the ejection system may eject both the first pilot and the second pilot in response to either the first pilot or the second pilot initiating ejection from the aircraft.

Figure 6:
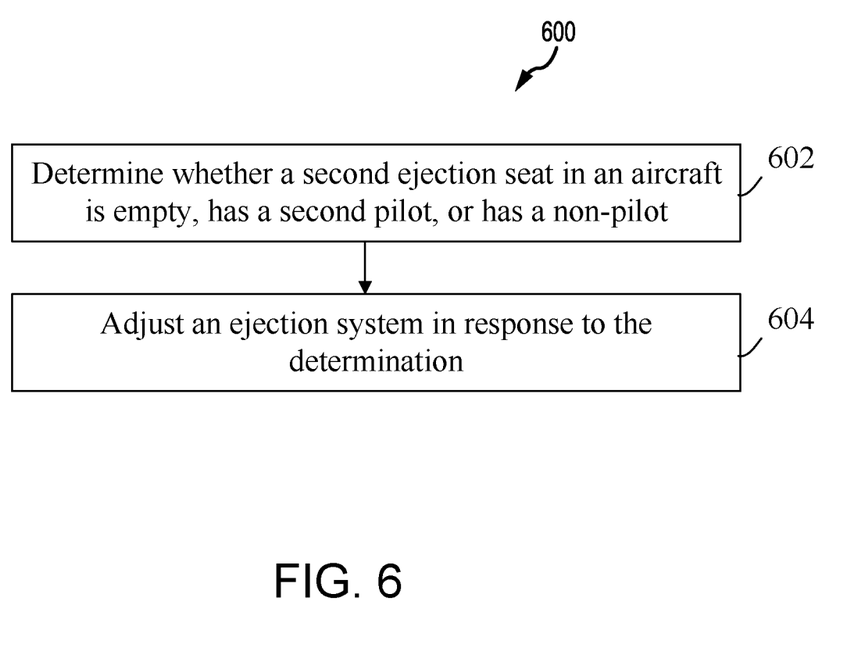
FIG. 6 illustrates a method for automatic ejection mode selection, in accordance with various embodiments.

Referring now to FIG. 6, a flowchart illustrates a method 600 for automatic adjustment of an ejection system, in accordance with various embodiments. The method 600 may be performed by components of a system similar to the system 100 of FIGS. 2A, 2B, 3A, and 3B and/or system 400 of FIG. 4.

In various embodiments, the method 600 comprises determining whether a second ejection seat in an aircraft is empty, has a second pilot, or has a non-pilot disposed therein (step 602). The determination may be made in accordance with the systems described above. In various embodiments, the method 600 further comprises adjusting an ejection system in response to the determination (e.g., adjusting the ejection system to a single pilot mode when the second ejection seat is empty, adjusting the ejection system to a dual occupant/single pilot mode when the ejection seat has a non-pilot, or adjusting the ejection system to a dual pilot mode when the second ejection seat has a pilot).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for a utomaticejection mode selection, the system comprising: a first ejection seat configured to receive a first pilot; a second ejection seat configured to receive a second pilot or a non-pilot; a user detection system configured to determine whether the second ejection seat has the second pilot, the non-pilot, or is empty; and a controller configured to adjust an ejection system i n response to determining whether the second ejection seat has the second pilot, the non-pilot, or
   is empty, wherein: the controller is configured to set the ejection system to a dual occupant/single pilot mode in response to the user detection system determining the second ejection seat has the non-pilot, the dual occupant/single pilot mode comprising only ejecting the second ejection seat in response to the non pilot initiating an ejection event, and the controller is configured to set the ejection system to a dual pilot mode in response to the user detection system determining the second ejection seat has the second pilot, the dual pilot mode comprising ejecting the first ejection seat and the second ejection seat in response to the second pilot initiating the ejection event.

2. The system of claim 1, wherein the user detecti on system comprises at least one of an input device configured to receive a user input and a sensor configured to detect user data corresponding to the ejection system.

3. The system of claim 2, wherein the user detection system includes an image sensor configured to detect image data corresponding to a user, and the user detection system determines whether the user is the second pilot or the non-pilot based on the image data.

4. The system of claim 2, wherein the user detection system includes the sensor with an electronic port configured to be electrically coupled to an electronic device, wherein the user data includes data received from the electronic device via the electronic port, and wherein the user data includes whether a user is the second pilot or the non-pilot.

5. The system of claim 1, further comprising an ejection mode selection system in communication with the controller, wherein: the ejection system is adjusted to a single pilot mode, the dual pilot mode, or the dual occupant/single pilot mode in response to the user detection system determining a status of the second ejection seat; and the controller is configured to set the ejection mode selection system to only eject the first ejection seat during the ejection event when the ejection system is, based on pilot occupancy, identified as having a single pilot.

6. The system of claim 5, wherein-the controller is configured to eject the first ejection seat and the second ejection seat during the ejection event initiated by the first pilot in response to the ejection system being set to the dual occupant/single pilot mode.

7. A method for automatic ejection mode selection for an ejection system with a first ejection seat and a second ejection seat, the method comprising: receiving, via an automatic ejection mode selection system, an indication whether the second ejection seat has a second pilot in the second ejection seat, has a non-pilot in the second ejection seat, or the second ejection seat is empty; and adjusting, via the automatic ejection mode selection system, the ejection system in response to determining an occupancy in the second ejection seat, wherein: a djustingthe ejection system further comprises adjusting the ejection system to a dual occupant/single pilot mode in response to the second ejection seat having the non-pilot, the dual occupant/single pilot mode comprising only ejecting the second ejection seat in response to the non-pilot initiating an ejection event and adjusting the ejection system further comprises adjusting the ejection system to a dual pilot mode in response to the second ejection seat having a pilot, the dual pilot mode comprising ejecting the first ejection seat and the second ejection seat in response to the second pilot initiating the ejection event.

8. The method of claim 7, further comprising receiving, via the automatic ejection mode selection system, passive data corresponding to a first pilot.

9. The method of claim 7, wherein adjusting the ejection system further comprises adjusting the ejection system to a single pilot mode in response to the second ejection seat being empty.

10. The method of claim 7, wherein in the dual occupant/single pilot mode, the first ejection seat and the second ejection seat are ejected in response to a first pilot in the first ejection seat initiating the ejection event.

11. The method of claim 7, further comprising receiving, via the automatic ejection mode selection system, user data from one of an input device configured to receive a user input or a sensor configured to detect the user data, wherein the non-pilot is determined when the user input does not match a pilot user input.

12. An article of manufacture including a tangible, non-transitorycomputer-readable storage medium having instructions stored thereon that, in response to execution by a processor, cause the processor to perform operations comprising: receiving, via the processor, passive data corresponding to each user of an ejection system having a first ejection seat and a second ejection seat; determining, via the processor, a desired ejection mode of the ejection system from potential ejection modes based on the passive data, the potential ejection modes including a dual occupant/single pilot mode, a dual pilot mode, and a single pilot mode and automatically commanding, via the processor, the ejection system to be in the desired ejection mode, wherein the operations further comprise adjusting the ejection system to the dual occupant/single pilot mode in response to the second ejection seat having a non-pilot, wherein the dual occupant/single pilot mode is configured to eject only the non-pilot in response to the non-pilot initiating an ejection event.

13. The article of manufacture of claim 12, wherein the operations further comprise a djusting the ejection system to the single pilot mode in response to the second ejection seat being empty, wherein the single pilot mode is configured to eject only a first pilot in response to the first pilot in the first ejection seat initiating the ejection event.

14. The article of manufacture of claim 13, wherein the operations further comprise a djusting the ejection system to the dual pilot mode in response to the second ejection seat having a second pilot, wherein the dual pilot mode is configured to eject both the first pilot a nd the second pilot in response to the first pilot or the second pilot initiating the ejection event.

\* \* \* \* \*

UNITED STATES PATENT AND TRADEMARK OFFICE
CERTIFICATE OF CORRECTION

PATENT NO. : 11,505,326 B2
APPLICATION NO. : 17/104623
DATED : November 22, 2022
INVENTOR(S) : Steven Holstine It is certified that error appears in the above-identified patent and that said Letters Patent is hereby corrected as shown below:

In the Claims

Column 11, Line 33: Claim 1, please delete "a utomaticejection" and insert --automatic ejection--

Column 11, Line 39: Claim 1, after the word "system", please delete "i n" and insert --in--

Column 11, Line 55: Claim 2, please delete "detecti on" and insert --detection--

Column 12, Line 57-58: Claim 12, please delete "non-transitorycomputer-readable" and insert --non-transitory computer-readable--

Column 13, Line 16: Claim 14, please delete "a dujsting" and insert --adjusting--

Signed and Sealed this
Twenty-first Day of February, 2023

Katherine Kelly Vidal
*Director of the United States Patent and Trademark Office*